Dec. 29, 1964     L. I. BENJAMEN     3,162,999

ENGINE EXHAUST SCAVENGING DEVICE

Filed May 16, 1962

INVENTOR.

Lysle I. Benjamen

BY Barnard & McGlynn

ATTORNEYS

United States Patent Office 3,162,999
Patented Dec. 29, 1964

3,162,999
ENGINE EXHAUST SCAVENGING DEVICE
Lysle I. Benjamen, 2099 E. Maple, Birmingham, Mich.
Filed May 16, 1962, Ser. No. 195,144
8 Claims. (Cl. 60—32)

This invention relates to an exhaust scavenging device for the engine of a craft propelled through a fluid and, in particular, relates to an underwater exhaust scavenging device adapted to be mounted exteriorly of a marine craft below water level and connected to the exhaust manifold of the engine thereof.

While a device constructed in accordance with the present invention may be utilized to advantage in other environments, it will facilitate an understanding of the invention if reference is made to its use as an exhaust scavenging device for the inboard-mounted engine of a marine craft for which it was specifically designed. Modern commercially available inboard motor boats and similar marine craft typically comprise an inboard-mounted marine engine connected through a suitable drive train to a propeller for propelling the craft through the water, the exhaust manifold or manifolds of the engine being connected through a hose or conduit to the transom of the boat hull to discharge engine exhaust gases above the water line of the hull. Such craft of modern design have been capable of operating at greater and greater water speeds due, for example, to the advent of the planing hull and other devices such as the hydro-foil. However, since the efficiency of the hull-propulsion system or combination is a function of the total non-productive system weight, the weight-to-horsepower ratio of the system has become a matter of increasing concern. Thus, it is highly desirable to decrease as much as possible the weight-to-horsepower ratio of an engine of such a marine craft and, of course, at the same time decreasing the total weight-to-horsepower ratio of the hull-propulsion system.

Furthermore, according to present modern practices, the aforementioned exhaust hose or conduit connecting the exhaust manifold or manifolds of the engine to the transom of a boat hull for discharge above the water line thereof is relatively long and expensive and, in addition to the cost of such an exhaust conduit, such a system normally requires an exhaust muffler as an additional accessory. In addition, some boat hull manufacturers have devised elaborate systems to prevent exhaust gases discharged at the transom above water level from being blown back into the passenger compartment of the boat by a trailing wind.

It is, therefore, a principal object and feature of this invention to provide a device which solves these and other problems in the art while contributing to an overall reduction in the cost and total weight-to-horsepower ratio of a hull-propulsion system for craft propelled through a fluid.

It is yet another object and feature of this invention to provide an underwater exhaust scavenging device adapted to be mounted exteriorly of a marine craft below water level and connected to the exhaust manifold or manifolds of the engine thereof, whereby water flowing through the device as the craft is propelled through a body of water at a predetermined minimum velocity will generate a relatively strong vacuum acting on the engine exhaust system to scavenge the latter and provide an increase in horsepower output through the resultant supercharging of the engine.

It is yet another object and feature of this invention to provide a device of the type aforedescribed characterized by the fact that the exhaust scavenging device operates below water level thereby acting as an exhaust muffler and eliminating the need, according to present commercial practices, of providing auxiliary exhaust mufflers above water level and elaborate systems for preventing exhaust discharged therefrom from being blown back into the passenger compartment of the craft by a trailing wind.

It is yet another object and feature of this invention to provide a device of the type aforedescribed further characterized by the fact that it is adapted to be suitably connected to the bottom of a boat hull thereby permitting the use of a relatively short exhaust connector between the device and the exhaust manifold or manifolds of the engine, thereby further contributing to the reduction in cost and weight of the entire propulsion system.

These and other objects, features and advantages of the invention will appear more fully hereinafter as the description thereof proceeds, and in which reference is made to the drawings in which.

Figure 1:
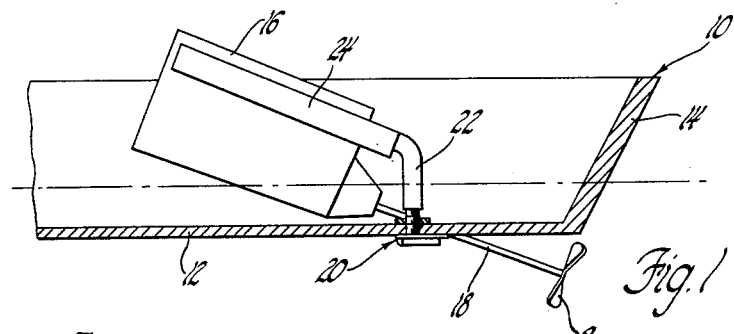
FIGURE 1 is a fragmentary side elevation of a marine craft equipped with a preferred embodiment of the exhaust scavenging device of this invention.

Referring now to the drawings, and particularly FIGURE 1 thereof, the numeral 10 generally indicates an inboard motor boat or similar marine craft comprising a hull 12 having the usual upstanding transom 14 at the rear thereof. A suitable internal combustion engine 16 is mounted in a conventional manner within the hull, and is connected through a suitable and conventional drive shaft 18 to the usual propeller 8. One preferred embodiment of an exhaust scavenging device constructed in accordance with this invention is illustrated generally at 20 as being suitably secured to the boat hull 12 below the water line indicated in phantom line, and connected through an exhaust conduit or hose 22 to an exhaust manifold 24 of the engine.

Figure 2:
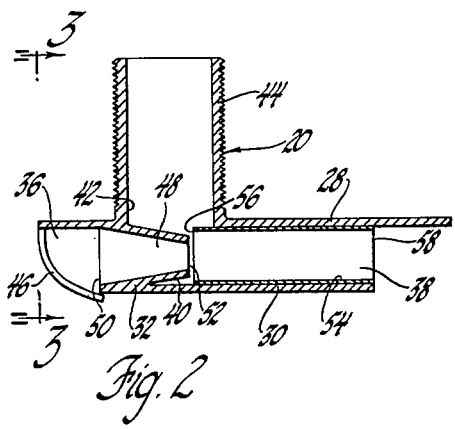
FIGURE 2 is an enlarged vertical section of the exhaust scavenging device shown in FIGURE 1.
Figure 3:
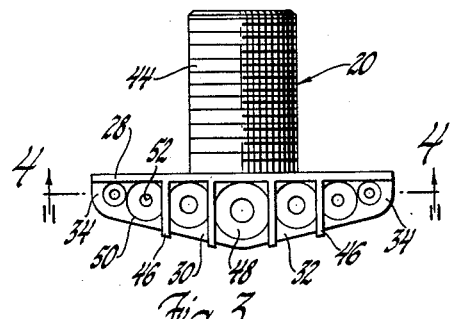
FIGURE 3 is a view taken on line 3—3 of FIGURE 2.
Figure 4:
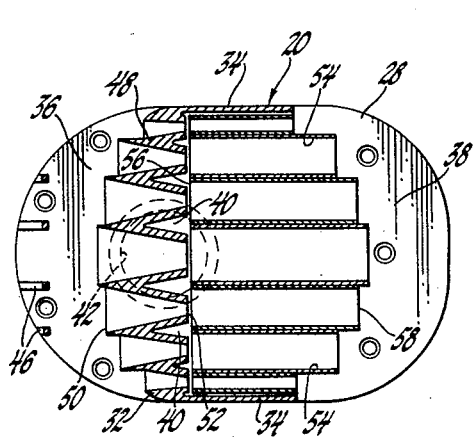
FIGURE 4 is a slightly enlarged sectional view taken on line 4—4 of FIGURE 3.

Referring now particularly to FIGURES 2 through 4, it will be seen that the exhaust scavenging device 20 comprises a preferably integral housing having upper and lower wall members 28 and 30, respectively, joined with a laterally elongate nozzle block 32 including oppositely spaced side walls 34 to form a laterally elongate entrance opening 36 at one end of the housing and a similar discharge opening 38 at the other end thereof communicating through the interior of the housing which includes an exhaust chamber 40. A circular exhaust inlet opening 42 is provided in the upper wall 28 of the housing so as to communicate the exhaust chamber 40 interiorly thereof with a cylindrical exhaust conduit or fitting 44 threaded or otherwise formed for insertion through the bottom of the boat hull 12 and securement thereto in fluid tight relationship as by a threaded coupling ring as indicated in FIGURE 1.

As will be readily apparent, with the device secured to the boat hull as aforedescribed, the elongate entrance opening 36 is presented in the path of forward travel of the boat through the water and, in a manner to be described hereinafter, to pick up and discharge water at a sufficiently great velocity as to create a vacuum in the exhaust chamber 40 to draw exhaust gases through the exhaust inlet opening 42 and discharge same with the water through the discharge opening 38 at the rearward end of the device. Preferably, a plurality of laterally spaced guards 46 extend between the upper and lower wall members of the housing at the entrance end thereof to prevent grass, weeds and other underwater debris from fouling the interior construction of the housing to be described during travel of the boat through the water.

The laterally elongate nozzle block 32 comprises a row of joined laterally spaced axially tapered frusto-conical venturi nozzles 48 each having a circular inlet opening 50 communicating with the entrance end of the housing and a smaller axially spaced and aligned circular outlet opening 52 communicating with and discharging into the exhaust chamber 40. It will be noted particularly from FIGURE 4 that the venturi nozzles 48 decrease in size or mean diameter or area from the nozzle located substantially on the longitudinal center line of the housing to each side thereof, and that the outlet openings thereof are disposed in a common plane while the inlet openings thereof are contained in axially staggered planes. Furthermore, from FIGURE 3 it will be noted that the loci of axial center lines of the nozzles 48 form a shallow concave curve relative to the upper wall of the housing.

A row of diffuser nozzles 54 are adapted to be removably mounted alongside each other within the nozzle block 32 in axial alignment with respective ones of the venturi nozzles 48, and each has a circular inlet opening 56 communicating with the exhaust chamber 40 immediately adjacent the outlet opening of its corresponding venturi nozzle and an axially spaced and aligned circular outlet opening 58 communicating with the discharge opening 38 of the housing. Each of the diffuser nozzles 54, being cylindrical, has a substantially uniform cross section between its inlet and outlet openings, while the inlet openings thereof are contained in a common plane and the outlet openings thereof are contained in axially staggered planes. Furthermore, the diffuser nozzles decrease in size or mean diameter or area in accordance with the venturi nozzles 48 as aforedescribed.

While the lengths, diameters and similar dimensions of the venturi and diffuser nozzles aforedescribed will ultimately depend on the overall dimensions desired for the housing, the number of nozzles desired and similar design considerations, certain other design considerations have been found to be extremely important to the end of providing the most efficient exhaust scavenging device possible. Thus, depending upon whether the craft is to operate in fresh water or salt water, each of the venturi nozzles should be constructed so as to have an internal included angle of 21° or 21.4°, respectively, for optimum efficiency. Nozzle angles larger than the values listed above will reduce water flow efficiency therethrough, while a smaller angle will cause a loss in efficiency due to increased laminar flow friction. Furthermore, again for optimum efficiency, the area of the inlet opening of each of the venturi nozzles should be between approximately four and sixteen times the area of the outlet opening thereof. In addition it will be noted that the respective inlet openings 56 of each of the diffuser nozzles is larger than the outlet opening 52 of its associated venturi nozzle. Again, for optimum efficiency, the difference in area between the inlet opening of each diffuser nozzle and the outlet opening of its associated venturi nozzle, which is the effective exhaust area opening from the exhaust chamber 40 through each diffuser nozzle, multiplied by the number of nozzles used in a set or in other words, the sum of such effective exhaust area openings should be at least equal to or greater than the area of the exhaust inlet opening 42.

In operation, as the boat hull planes through a body of water, water enters the venturi nozzles at a velocity and with a pressure head determined by the velocity of the boat through the body of water. Due to the angle of taper of the respective venturi nozzles 48 and the relationship between the areas of the inlet an doutlet openings thereof, water leaving the outlet openings of the nozzles causes a relative great pressure reduction in the exhaust chamber 40. The water discharged from the venturi nozzles and the exhaust gases drawn into the exhaust chamber by the aforementioned pressure reduction or vacuum effect enters the diffuser nozzles 54 and are discharged through the discharge opening 38 in the housing. As a result, the exhaust manifold of the engine is scavenged and the engine supercharged to increase the horsepower delivered therefrom, while the exhaust gases are discharged entirely below water level eliminating the need for an auxiliary muffler and providing the other advantages mentioned above.

Figure 5:
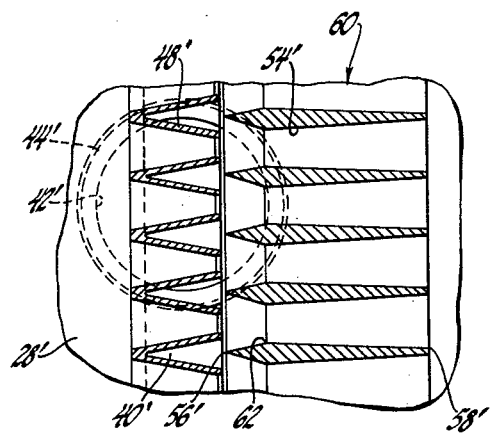
FIGURE 5 is a sectional view corresponding generally to FIGURE 4, but illustrating another preferred embodiment of the invention.

Another preferred embodiment of the invention is indicated generally at 60 in FIGURE 5 and, being generally similar to the embodiment previously described, like numerals primed are utilized to indicate parts corresponding generally to those previously described in connection with the embodiment of FIGURES 1 through 4. More specifically, in this embodiment of the invention, the exhaust conduit 44' discharges to the exhaust chamber 40' through an exhaust inlet opening 42', in the upper wall 28' of the housing as aforedescribed. However, the respective venturi nozzles 48' as compared to the embodiment previously described, are of identical size having their axial center lines contained in a common plane substantially parallel to housing upper wall 28' and the respective inlet and outlet openings thereof contained in common parallel planes. Furthermore, the respective diffuser nozzles 54' are not of uniform diameter throughout their length as in the previous embodiment but, rather, include an annular throat or restriction 62 intermediate the inlet and outlet openings 56' and 58', respectively, thereof and taper axially outwardly between such throat and such openings which are respectively contained in common parallel planes. The included angle of taper between the throat 62 and the inlet opening 56' of each diffuser nozzle has an included angle preferably of approximately 30°, while the included angle of taper between the throat and the outlet opening 58' of each diffuser nozzle is preferably between 5° and 10°. In this regard, substantial deviation in either direction from the 5° to 10° included angle of the rearward portion of each diffuser nozzle will tend to cause undesirable turbulence within the diffuser nozzles and reduce efficiency. Normally, the inlet opening 56' and outlet opening 58' of each diffuser nozzle will have substantially equal areas as illustrated in the drawing.

Apart from the tapered construction of the diffuser nozzles 54' the structural relationships aforedescribed in connection with the embodiment of FIGURES 1 through 4 are incorporated in the second embodiment; that is, the preferred range of included angles of the respective venturi nozzles, the ratio between the areas of their inlet and outlet openings and the relation between the area of the exhaust inlet opening and the sum of the differences in area between the outlet opening of each venturi nozzle and the inlet opening of the diffuser nozzle associated therewith.

The exhaust scavenging device 60 functions as previously described except for the fact that the tapered diffuser nozzles 54' while not vital to efficient operation of the device, enhances non-turbulent flow of water and exhaust products passing therethrough.

While but two forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

I claim:

1. An exhaust scavenging device adapted to be mounted within a fluid through which a craft is propelled and connected to the exhaust of the engine thereof, said device comprising a housing having an exhaust chamber interiorly thereof, exhaust inlet means communicating with said chamber, and a row of axially tapered venturi nozzles each having an inlet opening communicating with the exterior of said housing at one end thereof and a smaller axially spaced and aligned outlet opening communicating with said exhaust chamber, the mean areas of said respective venturi nozzles decreasing from a nozzle substantially in the center of the row thereof toward each end thereof, and a row of diffuser nozzles each having an inlet opening communicating with said exhaust chamber and an axially spaced and aligned outlet opening communicating with the exterior of said housing at the other end thereof, said diffuser nozzles being respectively axially aligned with said venturi nozzles whereby fluid flowing through said venturi nozzles creates a vacuum in said exhaust chamber to draw exhaust gases from said exhaust inlet means for discharge through said diffuser nozzles.

2. An exhaust scavenging device adapted to be mounted within a fluid through which a craft is propelled and connected to the exhaust of the engine thereof, said device comprising a housing having an exhaust chamber interiorly thereof, exhaust inlet means communicating with said chamber, a row of axially tapered venturi nozzles each having an inlet opening communicating with the exterior of said housing at one end thereof and a smaller axially spaced and aligned outlet opening communicating with said exhaust chamber, and a row of diffuser nozzles each having an inlet opening communicating with said exhaust chamber and an axially spaced and aligned outlet opening communicating with the exterior of said housing at the other end thereof, each of said diffuser nozzles including an internal throat intermediate its inlet and outlet openings and axially tapering outwardly therefrom toward said outlet opening thereof, the included angle of taper thereof being between approximately five degrees and ten degrees, the inlet and outlet openings of each said diffuser nozzles having substantially equal areas, said diffuser nozzles being respectively axially aligned with said venturi nozzles whereby fluid flowing through said venturi nozzles creates a vacuum in said exhaust chamber to draw exhaust gases from said exhaust inlet means for discharge through said diffuser nozzles.

3. An exhaust scavenging device adapted to be mounted within a fluid through which a craft is propelled and connected to the exhaust of the engine thereof, said device comprising a housing having an exhaust chamber interiorly thereof, exhaust inlet means communicating with said chamber, a row of axially tapered venturi nozzles each having an inlet opening communicating with the exterior of said housing at one end thereof and a smaller axially spaced and aligned outlet opening communicating with said exhaust chamber, and a row of diffuser nozzles each having an inlet opening communicating with said exhaust chamber and an axially spaced and aligned outlet opening communicating with the exterior of said housing at the other end thereof, the included angle of taper of each of said venturi nozzles being between approximately 21° and 21.4°, said diffuser nozzles being respectively axially aligned with said venturi nozzles whereby fluid flowing through said venturi nozzles creates a vacuum in said exhaust chamber to draw exhaust gases from said exhaust inlet means for discharge through said diffuser nozzles.

4. An exhaust scavenging device adapted to be mounted within a fluid through which a craft is propelled and connected to the exhaust of the engine thereof, said device comprising a housing having an exhaust chamber interiorly thereof, exhaust inlet means communicating with said chamber, a row of axially tapered venturi nozzles each having an inlet opening communicating with the exterior of said housing at one end thereof and a smaller axially spaced and aligned outlet opening communicating with said exhaust chamber, the area of said inlet opening of each of said venturi nozzles being between approximately four to sixteen times greater than the area of said outlet opening thereof, and a row of diffuser nozzles each having an inlet opening communicating with said exhaust chamber and an axially spaced and aligned outlet opening communicating with the exterior of said housing at the other end thereof, said diffuser nozzles being respectively axially aligned with said venturi nozzles whereby fluid flowing through said venturi nozzles creates a vacuum in said exhaust chamber to draw exhaust gases from said exhaust inlet means for discharge through said diffuser nozzles.

5. An exhaust scavenging device adapted to be mounted within a fluid through which a craft is propelled and connected to the exhaust of the engine thereof, said device comprising a housing having an exhaust chamber interiorly thereof, exhaust inlet means communicating with said chamber, a row of axially tapered venturi nozzles each having an inlet opening communicating with the exterior of said housing at one end thereof and a smaller axially spaced and aligned outlet opening communicating with said exhaust chamber, and a row of diffuser nozzles each having an inlet opening communicating with said exhaust chamber and an axially spaced and aligned outlet opening communicating with the exterior of said housing at the other end thereof, said diffuser nozzles being respectively axially aligned with said venturi nozzles whereby fluid flowing through said venturi nozzles creates a vacuum in said exhaust chamber to draw exhaust gases from said exhaust inlet means for discharge through said diffuser nozzles, said inlet openings of said diffuser nozzles being larger in area than said outlet openings of said respective venturi nozzles, the total difference in area between said last-named openings of all of said diffuser nozzles and all of said venturi nozzles being equal to or greater than the area of said exhaust inlet means.

6. An underwater exhaust scavenging device adapted to be mounted exteriorly of a marine craft below water level and connected to the exhaust of the engine thereof, said device comprising a housing having an exhaust chamber interiorly thereof, exhaust inlet means communicating with said chamber, an elongate venturi nozzle block mounted on said housing and including a row of axially tapered venturi nozzles each having a circular inlet opening communicating with the exterior of said housing at one end thereof and a smaller axially spaced and aligned circular outlet opening communicating with said exhaust chamber, the included angle of taper of each of said venturi nozzles being between approximately 21° and 21.4°, the area of said inlet opening of each of said venturi nozzles being between approximately four to sixteen times greater than the area of said outlet opening thereof, and a row of diffuser nozzles each having a circular inlet opening communicating with said exhaust chamber and an axially spaced and aligned circular outlet opening communicating with the exterior of said housing at the other end thereof, said diffuser nozzles being respectively axially aligned with said venturi nozzles and said inlet openings of said respective diffuser nozzles being larger in area than said outlet openings of said respective venturi nozzles, the total difference in area between said last-named openings of all of said diffuser nozzles and all of said venturi nozzles being equal to or greater than the area of said exhaust inlet means, whereby water flowing through said venturi nozzles creates a vacuum in said exhaust chamber to draw exhaust gases from said exhaust inlet means for discharge through said diffuser nozzles.

7. The invention as defined in claim 6 in which the mean diameters of said respective venturi nozzles decrease from a nozzle substantially in the center of the row thereof toward each end thereof.

8. The invention as defined in claim 6 in which each of said diffuser nozzles includes an internal throat intermediate its inlet and outlet openings and axially tapers outwardly therefrom toward said outlet opening thereof, the included angle of taper thereof being between approximately 5° and 10°, the inlet and outlet openings of each of said diffuser nozzles having substantially equal areas.

References Cited in the file of this patent

UNITED STATES PATENTS

| | | |
|---|---|---|
| 900,576 | Nelson et al. | Oct. 6, 1908 |
| 1,635,938 | Hudson | July 12, 1927 |
| 1,794,276 | Bowes | Feb. 24, 1931 |
| 2,264,765 | Le Veque | Dec. 2, 1941 |
| 2,293,632 | Sauer | Aug. 18, 1942 |

FOREIGN PATENTS

| | | |
|---|---|---|
| 119,301 | Switzerland | Mar. 1, 1927 |